United States Patent
Robert-Landry

(10) Patent No.: US 9,649,973 B2
(45) Date of Patent: May 16, 2017

(54) METHOD AND SYSTEM FOR CORRECTING THE ORIENTATION OF THE HEADLIGHTS OF A MOTOR VEHICLE

(71) Applicant: Valeo Vision, Bobigny (FR)

(72) Inventor: Caroline Robert-Landry, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/728,124

(22) Filed: Jun. 2, 2015

(65) Prior Publication Data

US 2015/0367771 A1    Dec. 24, 2015

(30) Foreign Application Priority Data

Jun. 3, 2014   (FR) ...................................... 14 55035

(51) Int. Cl.
  B60Q 1/115   (2006.01)
  B60Q 1/00   (2006.01)
  B60Q 1/10   (2006.01)

(52) U.S. Cl.
  CPC ............ B60Q 1/115 (2013.01); B60Q 1/0023 (2013.01); B60Q 1/10 (2013.01); *B60Q 2300/116* (2013.01)

(58) Field of Classification Search
  CPC .................................. B60Q 1/10; G01C 9/00
  USPC ............................ 701/36; 362/462, 466, 473
  See application file for complete search history.

(56) References Cited

U.S. PATENT DOCUMENTS

| | | | | |
|---|---|---|---|---|
| 2012/0002430 A1* | 1/2012 | Yamazaki | ................ | B60Q 1/10 362/464 |
| 2012/0259526 A1* | 10/2012 | Inoue | ................... | B60W 40/112 701/70 |
| 2012/0268958 A1* | 10/2012 | Kasaba | ..................... | B60Q 1/10 362/466 |
| 2012/0294020 A1* | 11/2012 | Kasaba | .................... | B60Q 1/10 362/466 |
| 2014/0077465 A1* | 3/2014 | Murakami | ............. | B62K 25/06 280/6.157 |
| 2014/0286025 A1* | 9/2014 | Kamitani | ............... | B60Q 1/115 362/466 |
| 2015/0088455 A1* | 3/2015 | Yamashita | ................ | G01C 9/08 702/155 |
| 2015/0151669 A1* | 6/2015 | Meisner | ................. | B60Q 1/085 701/49 |

(Continued)

FOREIGN PATENT DOCUMENTS

| | | |
|---|---|---|
| EP | 2524840 | 11/2012 |
| EP | 2708417 | 3/2014 |
| JP | 2009126268 | 6/2009 |

*Primary Examiner* — Thomas G Black
*Assistant Examiner* — Wae Louie
(74) *Attorney, Agent, or Firm* — Jacox, Meckstroth & Jenkins

(57) ABSTRACT

A method and system for correcting an inclination of headlights of a motor vehicle based on measurements of accelerations of the vehicle supplied by a sensor borne by the motor vehicle. The method and system comprises a step of computing a variation of inclination of the vehicle between a first distinct instant and a second distinct instant defining a duration during which the motor vehicle registers a single stoppage followed by a restart, as a function of the measurements of accelerations, and a step of controlling the inclination of the headlights as a function of a computed variation of inclination of the vehicle.

18 Claims, 2 Drawing Sheets

(56) References Cited

U.S. PATENT DOCUMENTS

Figure 1A:
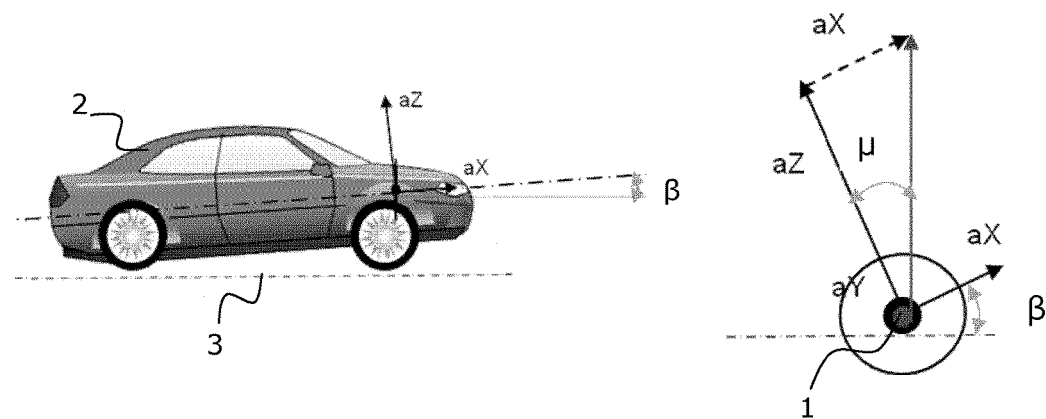

2015/0308827 A1* 10/2015 Fujii ................... G01C 19/00
                                                        702/151
2015/0367771 A1* 12/2015 Robert-Landry .... B60Q 1/0023
                                                         701/49
2016/0001695 A1* 1/2016 Fennelly ............... B60W 40/11
                                                         701/49

* cited by examiner

US 9,649,973 B2

METHOD AND SYSTEM FOR CORRECTING THE ORIENTATION OF THE HEADLIGHTS OF A MOTOR VEHICLE

CROSS-REFERENCE TO RELATED APPLICATIONS

This application claims priority to the French application 1455035 filed on Jun. 3, 2014, which application is incorporated herein by reference and made a part hereof.

BACKGROUND OF THE INVENTION

1. Field of the Invention

The present invention deals generally with correcting the orientation elevation-wise of the headlights of a motor vehicle, notably of an automobile.

2. Description of the Related Art

In the case of the use of certain light sources such as xenon lamps, and, presently, light-emitting diodes for the headlights of automobiles, the regulation dictates an automatic correction of the inclination of the headlights in order for the latter not to risk dazzling the drivers travelling in the incoming direction. The correction must take account of the inclination of the vehicle on the road, as a function of its load.

These days, there are solutions in which a differential sensor measures the height difference between the rear axle and the front axle of the vehicle. The information is then supplied to a correction system. This solution works very well and allows for a dynamic correction of the inclination of the headlights. Nevertheless, it requires an adjustment at the end of the vehicle production line, once the headlights are fitted onto the vehicle. Furthermore, this solution remains costly and is incompatible with the possibility of subsequently equipping a vehicle which would not have such a functionality on leaving the factory.

To mitigate the above drawbacks, the applicant has focused on developing headlights, or assemblies comprising headlights, which are independent in relation to the functionality of inclination correction as a function of the load of a vehicle.

The choice was focused on the use of at least one sensor of accelerometer type to measure the general inclination of the vehicle and/or of the platform on which is mounted the lighting module whose inclination is to be controlled, preferably incorporated in at least one of the headlights of a pair of headlights, even in each headlight.

By using an accelerometer on the vehicle or in the headlight to be controlled, a real time measurement is obtained of the accelerations of the vehicle within the terrestrial reference frame. It is therefore possible to deduce therefrom the inclination of the vehicle or of the platform of the module creating the beam to be controlled according to the position of the sensor by a simple computation. Nevertheless, because the measurement is made in the terrestrial reference frame and not in a reference frame linked to the vehicle, this simple measurement incorporates all the vehicle inclination factors in a non-dissociated manner. In particular, it is impossible to know if the measured inclination of the vehicle is due to the gradient of the road, to the load of the vehicle or even to a combination of the two.

SUMMARY OF THE INVENTION

The aim of the present invention is to overcome this issue. To do this, the subject of the present invention is a method for correcting the inclination of the headlights of a motor vehicle based on measurements of accelerations of the vehicle supplied by a sensor borne by the motor vehicle, the method comprising a step of computing the variation of inclination of the vehicle between a first and a second distinct instant defining a duration during which the motor vehicle registers a single stoppage followed by a restart, the variation of inclination being computed as a function of the measurements of accelerations, and a step of controlling the inclination of the headlights as a function of the computed variation of inclination of the vehicle.

The sensor can be an accelerometer or a gyrometer. The measurements of accelerations supplied by the sensor are measurements in the reference frame of the vehicle. For example, the sensor can supply measurements of the accelerations according to at least two axes, notably horizontal and vertical. In this case, the variation of inclination can be obtained based on the accelerations of the vehicle measured on these two axes.

According to other possible additional features:
- the method preferably comprises a preliminary step of initialization in which a measurement of inclination of the vehicle, intended to compute a first variation of inclination, is performed when the vehicle is placed on a horizontal flat zone;
- the method can comprise a step of measuring the speed of the vehicle, and the first instant corresponds to the instant at which the absolute value of the measured speed of the vehicle is less than or equal to a threshold value, notably is canceled out; the measured speed can be either positive or negative. For example, the threshold value can be 2 km/h;
- the method can comprise a step of computing an inclination of the vehicle before the single stoppage of the vehicle as a function of the measurements of accelerations of the vehicle by the sensor; the inclination of the vehicle before the single stoppage of the vehicle thus corresponds to the inclination at the first instant;
- the inclination of the vehicle is computed periodically, and the inclination of the vehicle before the single stoppage corresponds to the last inclination computed before the single stoppage; the computation period can, for example, be 3 ms;
- as a variant, the inclination of the vehicle being computed periodically, and the inclination of the vehicle before the single stoppage corresponds to an average value of a predetermined number of inclinations computed before the single stoppage; for example, the inclination of the vehicle before the single stoppage can correspond to the average value of the last ten inclinations computed before the single stoppage;
- the second instant can then correspond to an instant at which the measured speed of the vehicle becomes greater than zero, notably than the threshold value;
- the method can comprise a step of computing an inclination of the vehicle after the single stoppage of the vehicle as a function of the measurements of accelerations of the vehicle by the sensor;
- the inclination of the vehicle being computed periodically, the inclination of the vehicle after the single stoppage corresponds to the first inclination computed after the single stoppage; in this case, the inclination of the vehicle after the single stoppage of the vehicle thus corresponds to the inclination at the second instant; in this embodiment, the periodic step of computing the inclination of the vehicle is suspended during the stoppage of the vehicle;

as a variant, the inclination of the vehicle being computed periodically, the inclination of the vehicle after the single stoppage corresponds to the last inclination computed during the single stoppage; in this case, the last inclination of the vehicle during the single stoppage of the vehicle thus corresponds to the inclination at the second instant; in this embodiment, the periodic step of computing the inclination of the vehicle is maintained during the stoppage of the vehicle, for example according to another period, notably 100 ms;

the method preferably comprises a step of measuring the acceleration of the vehicle; in this case, a measurement of inclination of the vehicle supplied by the sensor is not taken into consideration in the computation step only if the measured acceleration of the vehicle is below a predefined threshold value;

if a step of stoppage of the motor occurs during the duration during which the motor vehicle registers a single stoppage followed by a restart, the method further comprises a step of memorizing the last measurement of inclination of the vehicle measured by the sensor and the angle of inclination of the headlights.

Another subject of the invention is a system for correcting the inclination of the headlights of a motor vehicle, comprising at least one sensor borne by the motor vehicle, the sensor being suitable for supplying measurements of accelerations of the vehicle, a computer suitable for computing the variation of inclination of the vehicle between a first and a second distinct instant defining a duration during which the motor vehicle registers a single stoppage followed by a restart as a function of the measurements of accelerations, and means for controlling the inclination of the headlights as a function of the computed variation of inclination of the vehicle.

The sensor is a sensor of accelerometer type with two axes or with three axes.

As a variant, the sensor is a gyroscope, or more generally any sensor whose measurement reference frame is the terrestrial reference frame.

In one possible embodiment, each headlight with which the vehicle is equipped incorporates the sensor.

According to a preferred variant embodiment for an automobile equipped with a pair of headlights, only one of the headlights includes a sensor and the computer, the inclination of the other headlight being slaved to the inclination of the headlight incorporating the sensor via a link, preferably wired, between the two headlights.

These and other objects and advantages of the invention will be apparent from the following description, the accompanying drawings and the appended claims.

BRIEF DESCRIPTION OF THE ACCOMPANYING DRAWINGS

Figure 1B:
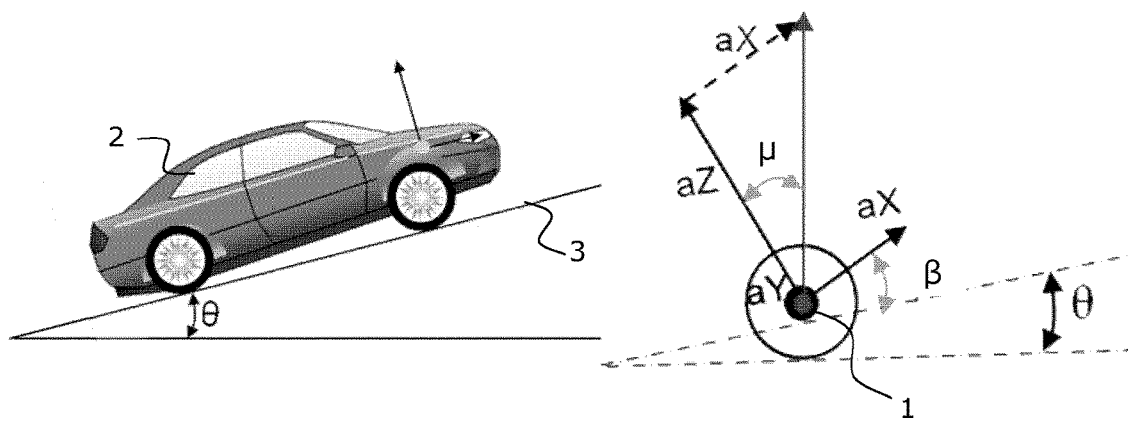
Figure 2:
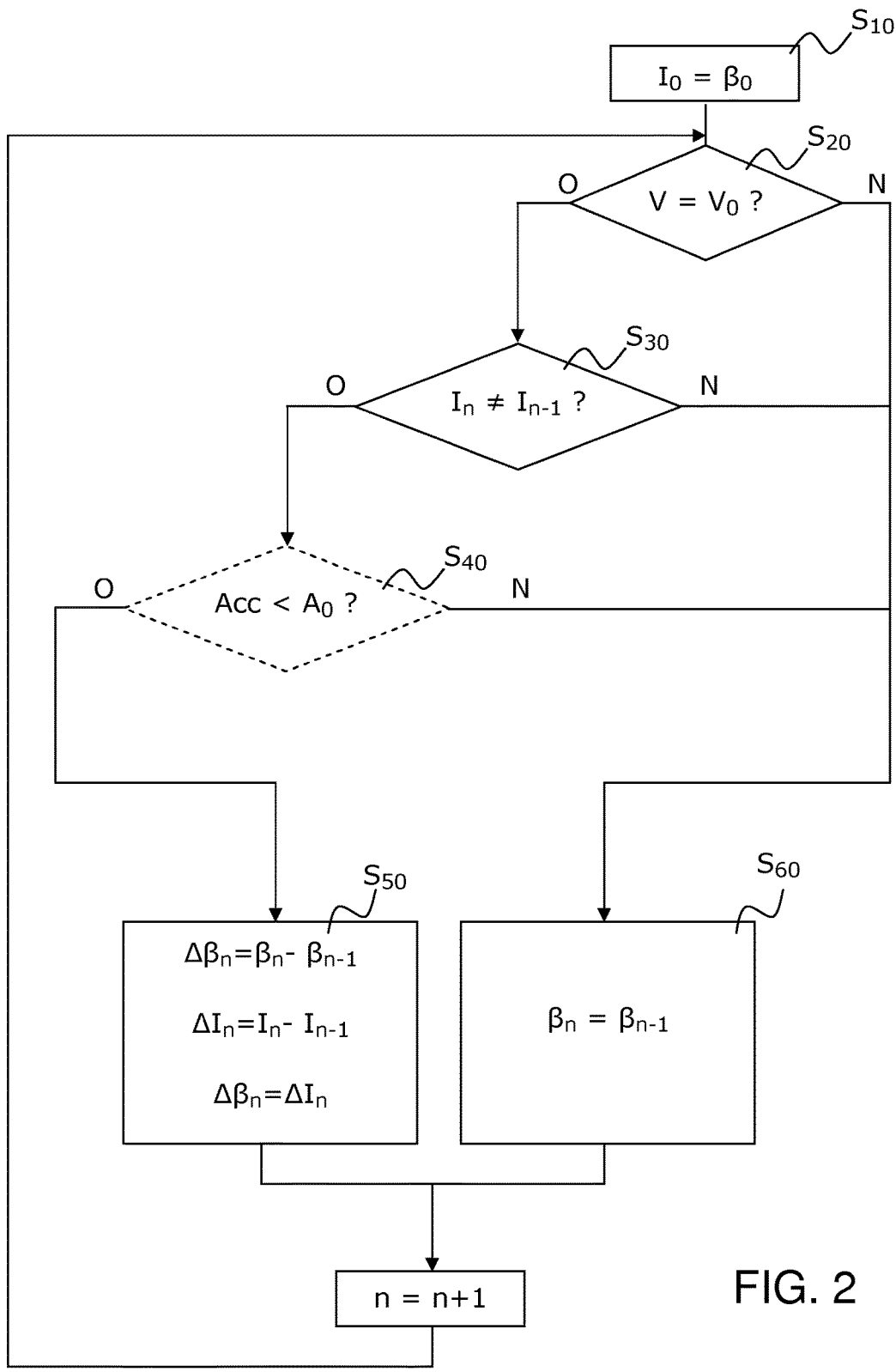

The invention and the advantages that it provides will be better understood in light of the following description, given with reference to the attached figures, in which:

FIG. 1A schematically represents a vehicle equipped with an accelerometer, and moving on a horizontal road;

FIG. 1B schematically represents this same vehicle moving on an upward gradient; and FIG. 2 gives a simplified block diagram of an exemplary correction method conforming to the present invention.

DETAILED DESCRIPTION OF THE PREFERRED EMBODIMENTS

FIGS. 1A and 1B schematically illustrate a sensor of accelerometer type 1 with which a vehicle 2 is equipped, the vehicle 2 being stopped or moving on a road 3, respectively in the case of a horizontal road 3 and in the case of a road 3 with upward gradient. The reference frame (aX, aY, aZ) represented to the right of each figure is the reference frame of the vehicle 2.

There are several types of accelerometers on the market. One of the differences between them being the number of axes available on which they will measure an acceleration. The sensor 1 can be a sensor with two axes. Nevertheless, a sensor with three axes may be preferable in as much as it also makes it possible to take account of the effects of banking which may be not inconsiderable, and thus offer greater accuracy in the measurements.

It is assumed hereinbelow, in a nonlimiting manner, that the sensor 1 is an accelerometer with two axes (aX, aZ). The variation of inclination can thus be obtained from the accelerations of the vehicle 2 measured on these two axes aX, aZ.

The measurement of inclination I delivered by an accelerometer linked to the chassis of a vehicle 2 or to the platform of a headlight module creating the beam to be controlled is given on the one hand by the relationship:

$$I = a \times \tan \cdot \left(\frac{aX}{aZ}\right),$$

and on the other hand by the relationship:

$$I = \beta + \theta$$

in which, θ corresponds to the inclination of the road 3 relative to the horizontal, and β corresponds to the inclination of the vehicle 2 on the road 3.

FIG. 2 illustrates, in the form of a simplified block diagram, different steps implemented in a method for correcting the inclination of headlights, in accordance with the invention, that make it possible to overcome the issue of the a prior knowledge of the gradients of the road 3.

The method rests on the following two observations:

The variation of inclination of a vehicle 2 due to the variation of load thereof can occur only when the vehicle 2 is stopped.

Furthermore, the variation of inclination of a vehicle 2 when stopped is necessarily linked to a variation of load.

Armed with these two observations, a correction method according to the present invention consists in measuring the variation of inclination on each stoppage and restart thereof, and in relatively controlling the movement of the headlights to slave it to this variation of inclination.

Hereinbelow, the following notations are used:

$I_0$ and $\beta_0$ are the initial values corresponding respectively to the angle measured by the accelerometer sensor 1 and to the angle of inclination of the headlights relative to the vehicle 2, to be corrected as a function of the load thereof;

$I_n$ is the measurement given by the accelerometer 1 at the instant n;

$\beta_n$ is the angle of inclination of the headlights at the instant n;

$\Delta I_n$ is the variation between two measurements given by the accelerometer 1 at two successive instants (n−1) and n;

$\Delta \beta_n$ is the variation between two angles of inclination of the headlights at two successive instants (n−1) and n.

A so-called initialization step $S_{10}$ represented in FIG. 2 corresponds to the moment when the vehicle 2 leaves the garage or a service station. The gradient of the road 3 is then considered to be zero, such that the following relationship applies:

$$I_0 = \beta_0$$

Since the speed of the vehicle 2 is also being measured, it is possible to identify the instant at which the vehicle 2 stops, that is to say the instant at which the measured speed of the vehicle 2 is canceled out (step $S_{20}$), then the instant at which the vehicle 2 restarts, that is to say the instant at which the measured speed of the vehicle 2 once again becomes greater than zero.

The measurements $I_{n-1}$ and $I_n$ of inclination of the vehicle 2 supplied by the sensor 1 are then compared (step $S_{30}$).

Given the two observations made previously, a non-zero variation $\Delta I_n$ can be obtained only in the case where the load of the vehicle 2 has been modified between these two instants, for example if passengers have climbed in or out of the vehicle 2 within the interval. To meet the regulation, the movement of the headlights is then controlled as a function of the variation $\Delta I_n$. In other words, the inclination of the headlights is modified to satisfy the equation shown in the step $S_{50}$:

$$\Delta \beta_n = \beta_n - \beta_{n-1} = \Delta I_n = I_{n-1}$$

Conversely, no modification in the inclination of the headlights is made if no variation in the measurement supplied by the accelerometer 1 has been detected. This case is represented in FIG. 2 by the step $S_{60}$ for which the inclination $\beta_n$ is unchanged relative to the inclination $\beta_{n-1}$.

No absolute measurement of the inclination of the vehicle 2 due to the load is therefore obtained, but the relative information obtained by comparing the preceding state is necessary and sufficient for the adjustment of the headlights automatically in static/dynamic mode.

Optionally, the method can also comprise a step of measuring the acceleration Acc or the vehicle 2 and of comparing the measured acceleration to a predefined threshold value $A_0$ (step $S_{40}$). This advantageously makes it possible to take into account, in the computation step, a measurement of inclination of the vehicle 2 supplied by the sensor 1 only when the measured acceleration of the vehicle 2 is below this predefined threshold value. Measurement errors due to an abrupt movement of the body of the vehicle 2, for example when the driver actuates the handbrake, are thus mitigated.

Finally, $I_n$ and $\beta_n$ are given in the figure by way of example. In practice, $I_n$ and $\beta_n$ are derived from a series of measurements averaged over a period T of the order of a few ms or a few seconds.

Thus, the robustness of the system and its response to the changes of load following stopping of the vehicle 2 are assured.

In another possible implementation of a method according to the invention, the correction of inclination applied to the headlights is derived from the last variation of inclination of the vehicle 2 measured by the sensor 1 just before the vehicle 2 stops. This variant offers the advantage of not overgearing the corrections of inclination of the lighting module and requires the provision of two vehicle inclination measurement storage areas. According to this variant, as soon as the measured speed of the vehicle 2 passes below a predetermined and non-zero threshold value $V_0$, for example of the order of 2 km/hour, the accelerometer 1 supplies a measurement $I_n$ of the inclination of the vehicle 2, this measurement being stored in memory.

As long as the speed of the vehicle 2 remains below the threshold value $V_0$, the sensor 1 continues to periodically measure, for example every 10 milliseconds, the inclination of the vehicle 2. The value measured periodically is smoothed to obtain an average periodic inclination value say over 100 ms (values given purely by way of example), and the average value is stored at each end of period, replacing the preceding value.

At the instant at which the measured speed of the vehicle 2 passes back above the threshold value $V_0$, the sensor 1 again measures the inclination of the vehicle 2 and the correction system computes the variation $\Delta I$ obtained relative to the last stored average value. Just as in the preceding case, the variation $\Delta \beta$ in the inclination of the headlights is slaved to the duly computed variation $\Delta I$.

It will be noted that the correction methods described above and conforming to the invention do not allow for the automatic adjustment of the height of the headlights in pure dynamic mode. In other words, no account is taken of the variations of inclination of the body of the vehicle 2 due to the vehicle dynamics (due to the accelerations/decelerations of the vehicle 2 for example or due to roadway unevennesses such as paving blocks, potholes or humps). This functionality is not however required by the regulation.

Moreover, in all cases, if a step of stoppage of the motor occurs during the duration during which the motor vehicle 2 registers a single stoppage followed by a restart, the system must memorize the last measurement of inclination of the vehicle 2 measured by the sensor 1 and the angle of inclination of the headlights.

The correction methods described previously can be implemented by different system architectures.

It is for example possible to provide for a sensor 1 of accelerometer type to be positioned on the chassis of the vehicle 2, and to slave the inclination of the pair of headlights with which the vehicle 2 is equipped via a communication link, preferably wired (for example of LIN bus, CAN bus, or direct link type).

Another particularly advantageous implementation consists in incorporating the sensor 1 of accelerometer type and the computer suitable for processing the different measurements and for controlling the movement of the headlights inside the headlight of the vehicle 2. Ideally, only one of the two headlights of one and the same pair will incorporate the sensor 1, and a communication link, preferably wired, is provided between the two headlights so that the movement of the two headlights can be controlled in the same way.

To take account of the possible drifts of the system over time, regular reset procedures are advantageously provided. In particular, a reset can be provided every 10 000 kilometers, when the vehicle 2 goes into a garage for servicing. Other intermediate resets can also be envisaged on going into a service station, for example every 600 kilometers.

During these reset procedures, the vehicle 2 is placed on a horizontal flat zone, which makes it possible to obtain an absolute measurement of the inclination of the vehicle 2.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A method for correcting an inclination of headlights of a motor vehicle based on measurements of accelerations of said motor vehicle supplied by a sensor borne by said motor vehicle, said method comprising the steps of:
sensing with said sensor a first acceleration measurement and a second acceleration measurement;
computing a variation of inclination of said motor vehicle between a first distinct instant and a second distinct instant, said first and second distinct instants defining a duration during which said motor vehicle registers a single stoppage followed by a restart, said variation of inclination being computed as a function of said first acceleration measurement and said second acceleration measurement, and
controlling said inclination of said headlights as a function of said computed variation of inclination of said motor vehicle;
wherein said computing step further comprises a step of computing an inclination of said motor vehicle before said single stoppage of said motor vehicle as a function of said first and second acceleration measurements of said motor vehicle;
wherein said inclination of said motor vehicle is computed periodically, said inclination of said motor vehicle before said single stoppage corresponds to a last inclination of said vehicle which was computed before said single stoppage; and
wherein said first acceleration measurement is associated with said first distinct instant which occurs before said single stoppage.

2. The correction method according to claim 1, wherein said method comprises a step of measuring a speed of said motor vehicle, and in that said first distinct instant corresponds to an instant at which an absolute value of said measured speed of said motor vehicle is less than or equal to a threshold value, and notably is canceled out.

3. The correction method according to claim 2, wherein said second instant corresponds to an instant at which said measured speed of said motor vehicle becomes greater than zero, notably than said threshold value.

4. The correction method according to claim 2, wherein said method further comprises a step of measuring an acceleration of said motor vehicle, and in that a measurement of inclination of said motor vehicle supplied by said sensor is taken into consideration in a computation step only if said measured acceleration of said motor vehicle is below a predefined threshold value.

5. The correction method according to claim 2, wherein if a step of stoppage of said motor vehicle occurs during the duration during which said motor vehicle registers a single stoppage followed by a restart, said method further comprises a step of memorizing a last measurement of inclination of said motor vehicle measured by said sensor and an angle of inclination of said headlights.

6. The correction method according to claim 1, wherein said inclination of said motor vehicle being computed periodically, said inclination of said motor vehicle before said single stoppage corresponds to an average value of a predetermined number of inclinations computed before said single stoppage.

7. The correction method according to claim 1, wherein said second instant corresponds to an instant at which said measured speed of said motor vehicle becomes greater than zero, notably than a threshold value.

8. The correction method according to claim 7, wherein said method comprises a step of computing an inclination of said motor vehicle after said single stoppage of said motor vehicle as a function of said measurements of accelerations of said motor vehicle by said sensor.

9. The correction method according to claim 8, wherein said inclination of said motor vehicle being computed periodically, said inclination of said motor vehicle after said single stoppage corresponds to a first inclination computed after said single stoppage.

10. The correction method according to claim 8, wherein said inclination of said motor vehicle being computed periodically, said inclination of said motor vehicle after said single stoppage corresponds to a last inclination computed during said single stoppage.

11. The correction method according to claim 1, wherein said method further comprises a step of measuring an acceleration of said motor vehicle, and in that a measurement of inclination of said motor vehicle supplied by said sensor is taken into consideration in a computation step only if said measured acceleration of said motor vehicle is below a predefined threshold value.

12. The correction method according to claim 1, wherein if a step of stoppage of said motor vehicle occurs during the duration during which said motor vehicle registers a single stoppage followed by a restart, said method further comprises a step of memorizing a last measurement of inclination of said motor vehicle measured by said sensor and an angle of inclination of said headlights.

13. The correction method according to claim 1, wherein said method further comprises a step of measuring an acceleration of said motor vehicle, and in that a measurement of inclination of said motor vehicle supplied by said sensor is taken into consideration in a computation step only if said measured acceleration of said motor vehicle is below a predefined threshold value.

14. A system for correcting an inclination of headlights of a motor vehicle, comprising:
at least one sensor for sensing a first acceleration measurement and a second acceleration measurement;
said at least one sensor borne by said motor vehicle, said at least one sensor being suitable for supplying measurements of accelerations of said motor vehicle;
a computer suitable for computing a variation of inclination of said motor vehicle between a first and a second distinct instant, said first and second distinct instants defining a duration during which said motor vehicle registers a single stoppage followed by a restart as a function of said first acceleration measurement and said second acceleration measurement, and means for controlling said inclination of said headlights as a function of said computed variation of inclination of said motor vehicle;
wherein said system computes an inclination of said motor vehicle before said single stoppage of said motor vehicle as a function of said first and second acceleration measurements of said motor vehicle;
wherein said inclination of said motor vehicle is computed periodically, said inclination of said motor vehicle before said single stoppage corresponds to the last inclination of said vehicle which was computed before said single stoppage;
wherein said first acceleration measurement is associated with said first distinct instant which occurs before said single stoppage.

15. The system according to claim 14, wherein said at least one sensor is a sensor of accelerometer type with two axes or with three axes.

16. The system according to claim 15, wherein said at least one sensor and said computer are incorporated in one of said headlights.

17. The system according to claim 14, wherein said at least one sensor and said computer are incorporated in one of said headlights.

18. The system according to claim 17, wherein said system further comprises a communication link between said headlight incorporating said at least one sensor and said computer and said other headlight to make it possible to also control said inclination of said other headlight.

\* \* \* \* \*

UNITED STATES PATENT AND TRADEMARK OFFICE
CERTIFICATE OF CORRECTION

PATENT NO. : 9,649,973 B2
APPLICATION NO. : 14/728124
DATED : May 16, 2017
INVENTOR(S) : Caroline Robert-Landry It is certified that error appears in the above-identified patent and that said Letters Patent is hereby corrected as shown below:

In the Specification

Column 5, Line 31, delete "$\Delta\beta_n = \beta_n - \beta_{n-1} = \Delta I_n = I_{n-1}$", and insert --$\Delta\beta_n = \beta_n - \beta_{n-1} = \Delta I_n = I_n - I_{n-1}$-- therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*